July 8, 1958
A. B. MOJONNIER
2,841,936
CARTON FILLING APPARATUS
Filed Sept. 23, 1954
8 Sheets-Sheet 3
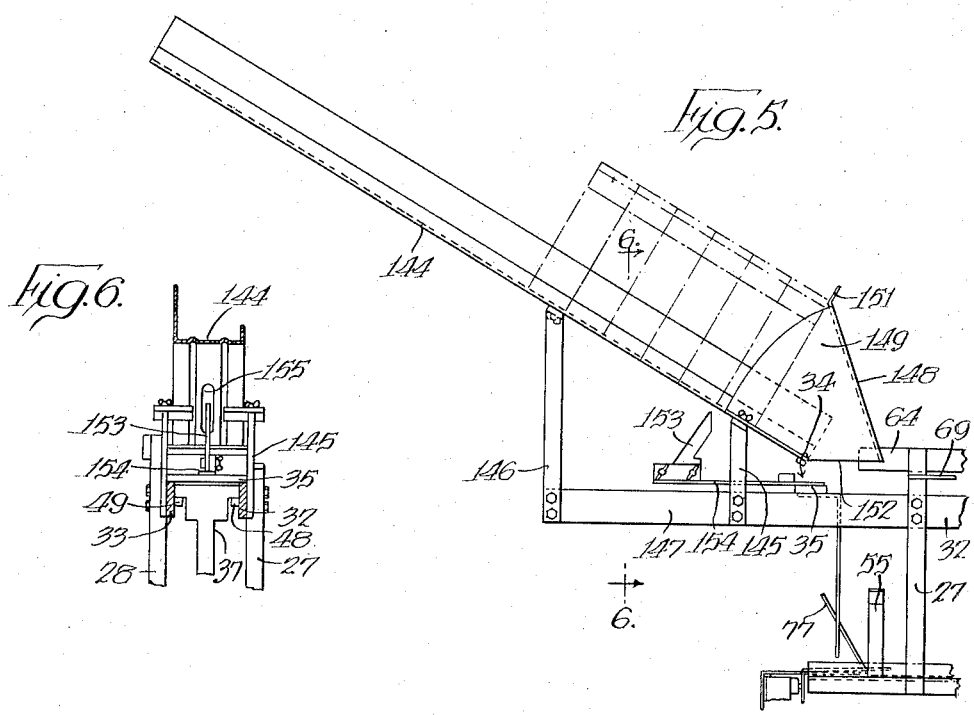
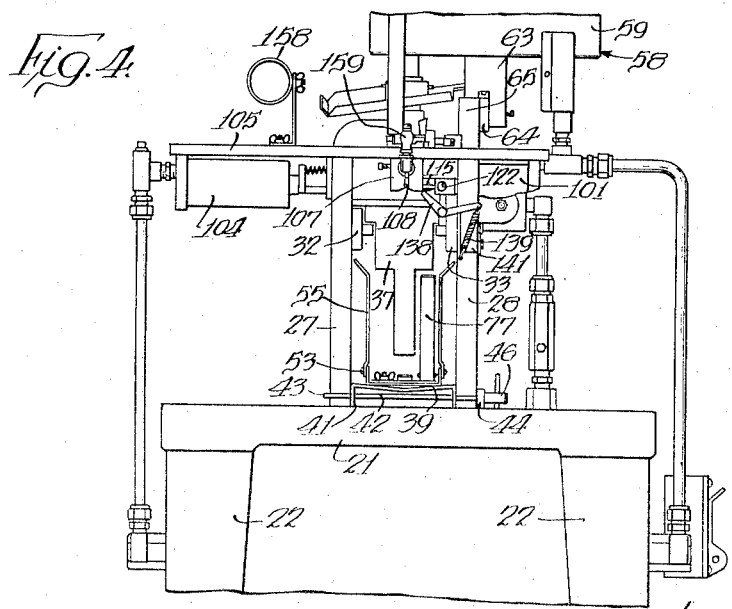
Inventor.
Albert B. Mojonnier
By McCanna & Morsbach
Attys.

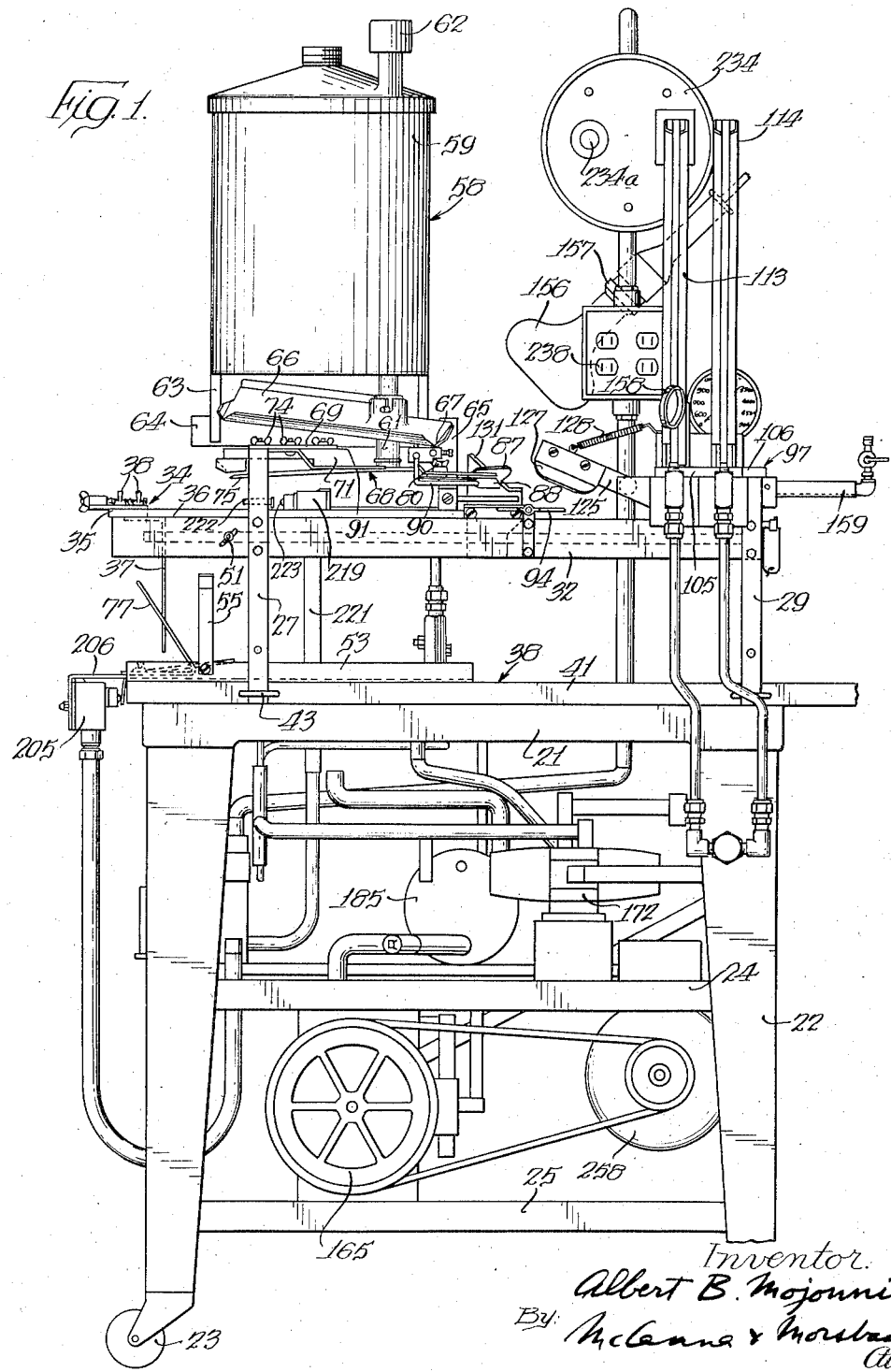

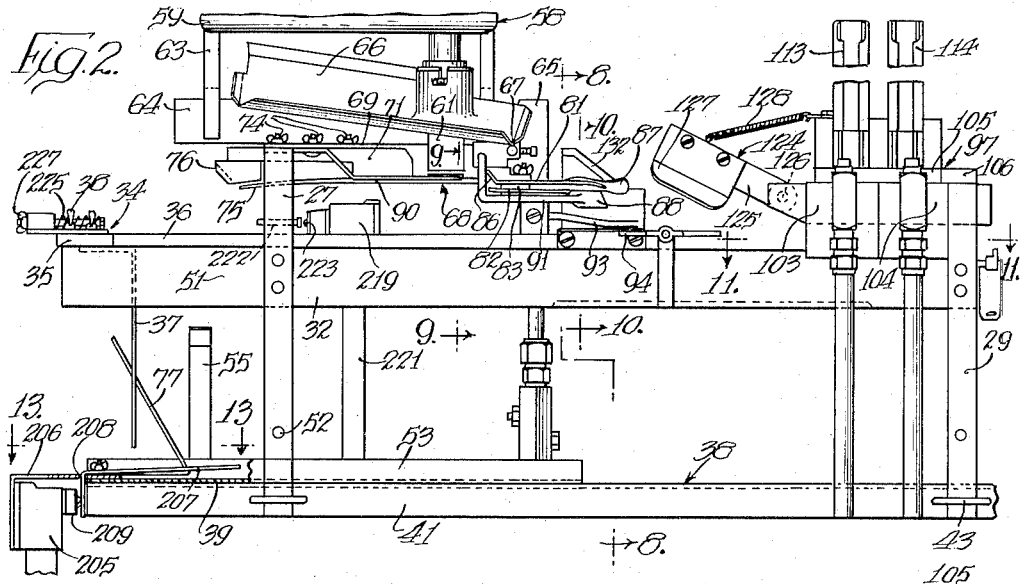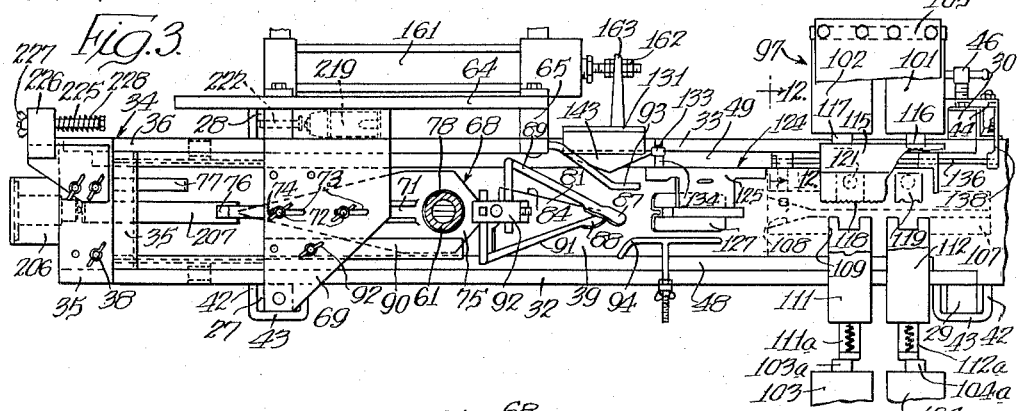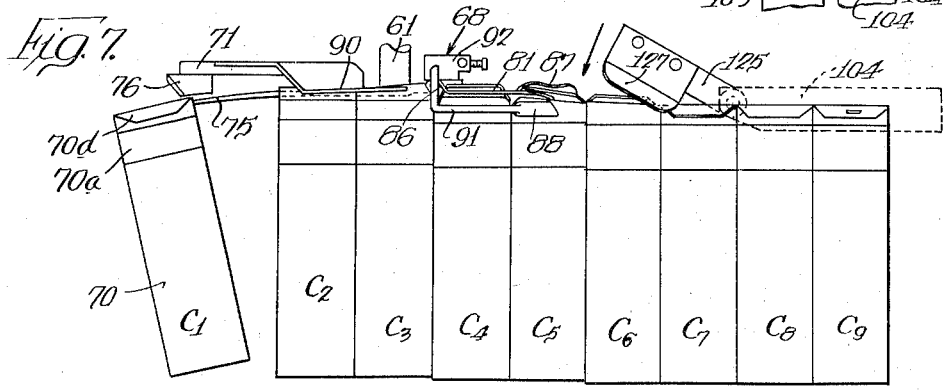

July 8, 1958 A. B. MOJONNIER 2,841,936
CARTON FILLING APPARATUS
Filed Sept. 23, 1954 8 Sheets-Sheet 4
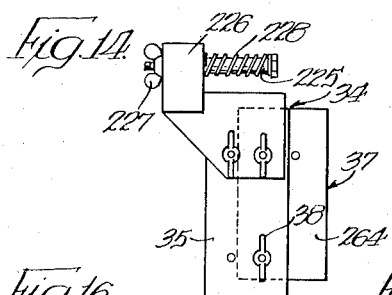
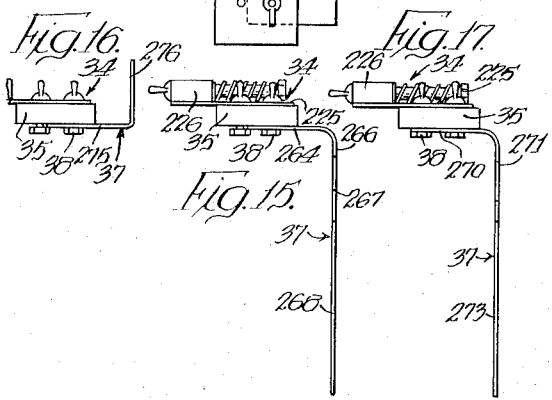
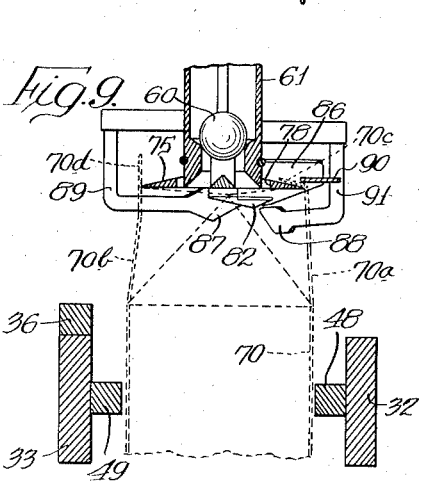
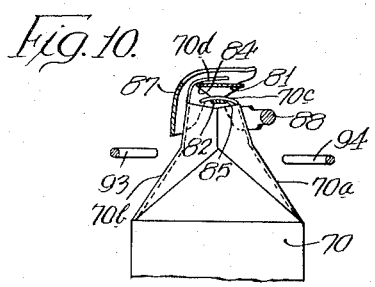
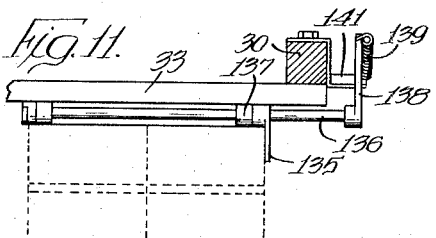
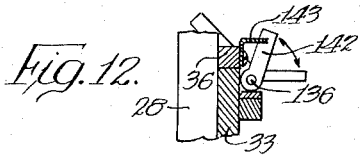
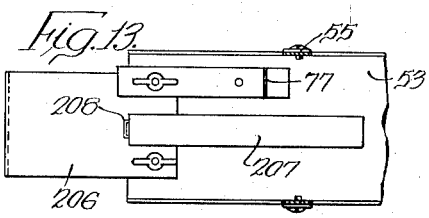
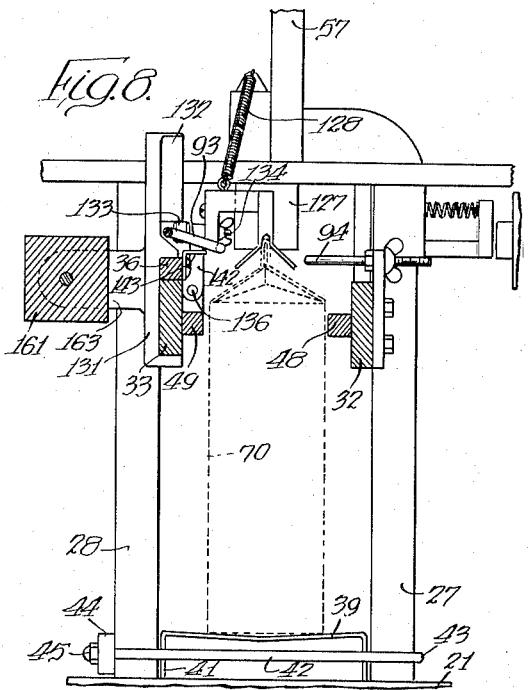
Inventor.
Albert B. Mojonnier
By McKenna & Morsbach
Attys.

July 8, 1958     A. B. MOJONNIER     2,841,936
CARTON FILLING APPARATUS
Filed Sept. 23, 1954     8 Sheets-Sheet 5

Inventor.
Albert B. Mojonnier
By: McCanna & Morsbach
Attys.

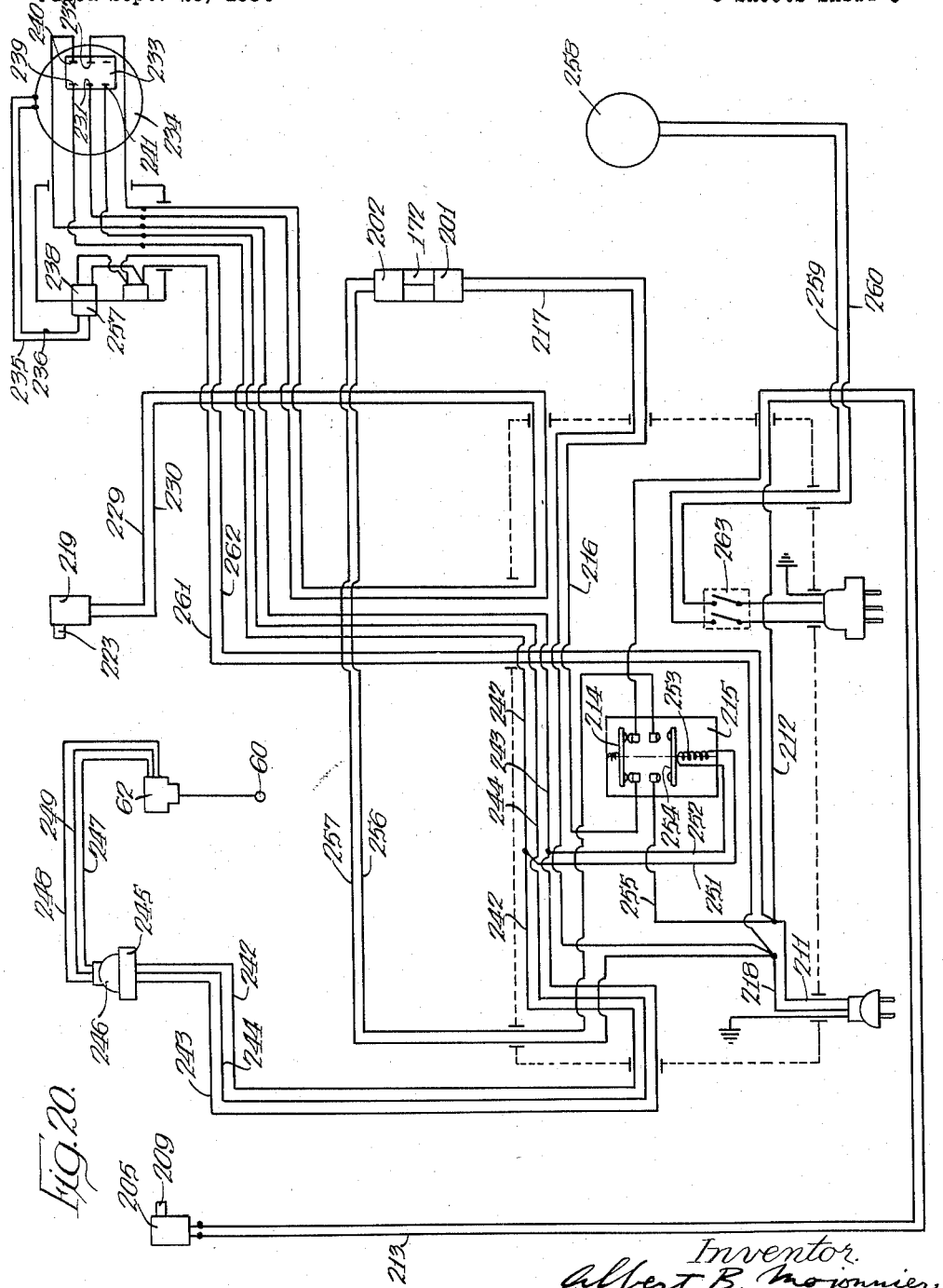

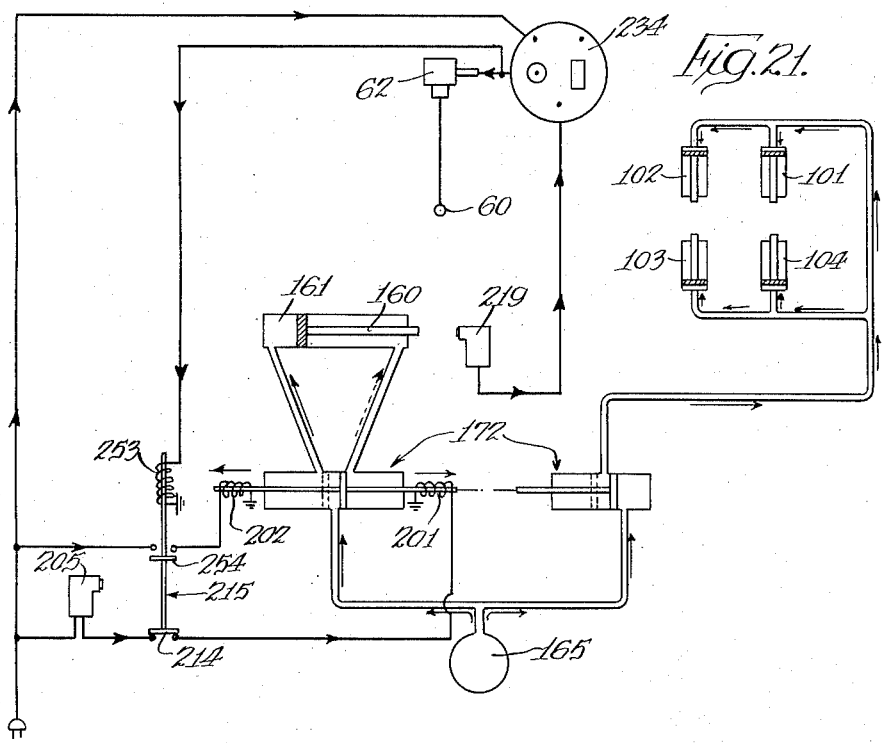
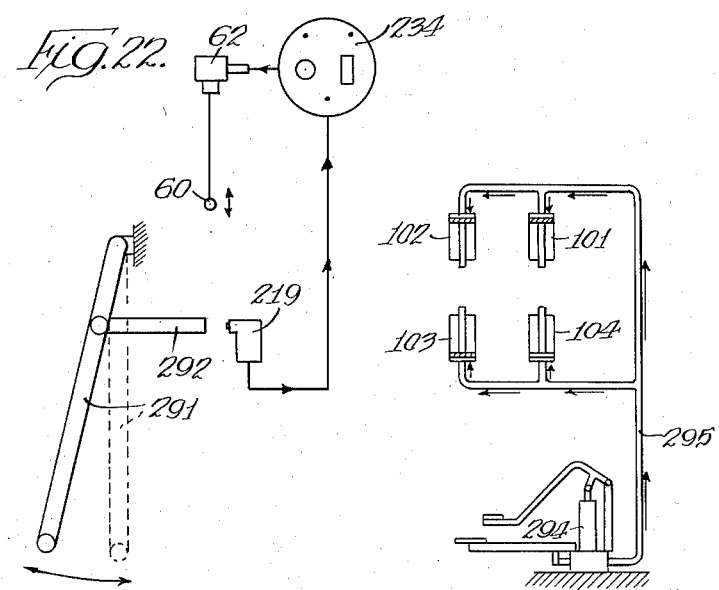

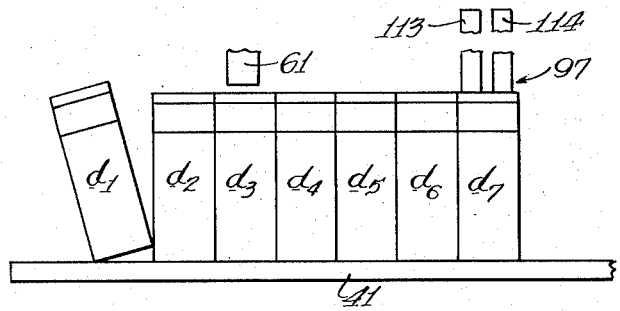
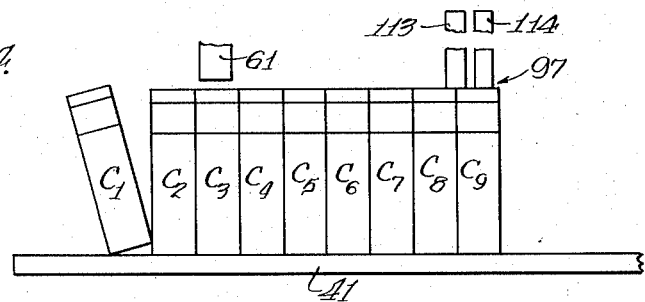
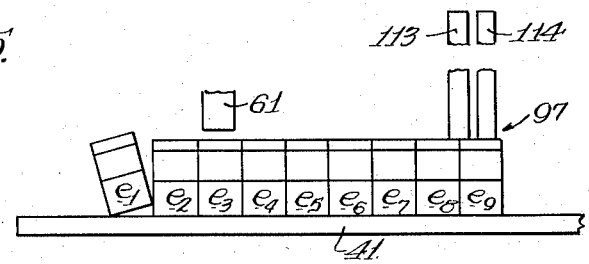
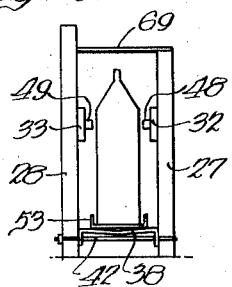 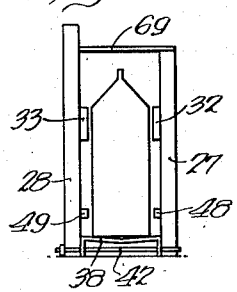 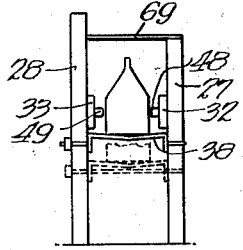

United States Patent Office 2,841,936
Patented July 8, 1958

2,841,936

CARTON FILLING APPARATUS

Albert B. Mojonnier, Chicago, Ill.

Application September 23, 1954, Serial No. 457,849

19 Claims. (Cl. 53—266)

This invention comprises novel and useful improvements in filling machines and more particularly pertains to a machine for filling preformed paper cartons with liquids.

Various automatic filling machines have heretofore been devised for filling and closing containers, and in general such filling machines have employed a conveyor, of one form or another, for individually conveying the containers past the successive stations of the filling machine. Such conveyers add greatly to the complexity and cost of the filling machine and in some industries, such as the dairy industry, the cost of prior filling machines using conveyers precluded the use thereof in all except very large dairies.

Another drawback of the filling machines using conveyers resides in the difficulty in adapting the filling machines to handle different sized containers. The containers, such as the paper cartons used in the packaging of milk, differ in height and cross sectional area for the different sized containers. It is therefore necessary to adjust the relative spacing between the container advancing mechanism and the several instrumentalities including the opener, the filler, the closer and the sealing mechanism, to accommodate containers having different height. When a conveyor is used to move the containers successively past the several instrumentalities, this adjustment is rendered difficult since either some complex mechanism must be provided for elevating and lowering the entire conveyor or otherwise each of the several instrumentalities must be individually adjusted vertically relative to the conveyor.

A further problem presented in the filling of different sized containers lies in the adjustment of the rate of cycling of the filling machine. The containers are customarily advanced in step fashion to allow adequate time at each station to complete the operation thereat. The filling generally requires the longest time and thus controls the dwell time at which the containers are at rest at each station. The time required for filling the larger containers, such as the two-quart milk cartons, is relatively longer than the time required for filling the smaller cartons and in order to achieve the highest rate of filling commensurate with the size containers being filled, it is desirable to be able to control the rate of cycling of the filling machine to increase the dwell time during which the containers are at rest when filling large containers such as the two-quart size and to shorten the dwell time for the smaller sized containers. However, paper cartons such as are commonly used in the packaging of milk, cannot be rapidly accelerated, as occurs when advancing the containers between stations at a rapid rate, without damaging the cartons and causing the same to leak. It is therefore necessary to allow adequate transfer time for moving the cartons between stations to permit movement of the cartons at a sufficiently slow rate to prevent damage thereto. If the cycling control for the filling machine is such that a change in the dwell time for the containers at each station correspondingly changes the transfer time for moving the cartons between the stations, it is apparent that the optimum transfer rate for all sized cartons cannot be achieved. If the transfer time for the two-quart cartons is such as to transfer the latter at the most rapid rate possible without damage, then the transfer rate for the smaller sized cartons will be too high when the cycle is adjusted for the shorter fill time and will cause damage to the cartons. Conversely, if the transfer time when filling half-pint cartons is correct, then adjustment of the cycle to allow a large fill time required for the two-quart cartons will cause the cartons to be transferred between stations at a lower rate than is necessary and thus would limit the output of the filling machine.

An important object of this invention is the provision of a filling machine having a novel apparatus for advancing the containers past the successive stations which eliminates the necessity of a conveyer.

Another object of this invention is the provision of a novel apparatus for advancing the containers past the successive stations of the filling mechanism in which the containers are arranged in a row in sidewise abutting relation and are advanced a distance equal to the width of the container each time the container advancing mechanism is operated.

Another object of this invention is the provision of a filling machine which is readily adjustable to handle different sized containers during the filling thereof.

A further object of this invention is the provision of a filling machine arranged to advance the containers in step fashion past the several instrumentalities, and in which the dwell time of the cartons at each station is controlled by the time required for filling the containers.

Yet another object of this invention is the provision of a filling machine in accordance with the foregoing object, in which the transfer time for moving the containers between stations does not vary with the changes in the dwell time of the cartons at the stations thereby permitting transferring of the containers at the most rapid rate possible without damage thereto and independent of the size of the containers being filled.

Still another object of this invention is the provision of a filling machine having a timer controlled filling mechanism in which operation of the filler is initiated in response to advance of a container into filling position below the filler and in which recycling of the container advancing mechanism is prevented until completion of the filling operation.

An additional object of this invention is the provision of a machine for opening, filling, closing and sealing preformed paper cartons in which the cartons are advanced in a row in step fashion by a pusher, which machine is arranged to reduce the resistance to advance of the cartons in the row so that the pusher, when advancing the cartons, does not damage the same.

Yet a further object of this invention is the provision of a machine for automatically opening, filling, closing and sealing containers, which machine is small and compact and easily movable.

These, together with various ancillary objects and advantages of this invention will be more readily appreciated as the same becomes better understood by reference to the following detailed description when taken in connection with the accompanying drawings:

Figure 1 is a side elevational view of the filling machine;

Fig. 2 is a fragmentary side elevational view of the filling machine;

Fig. 3 is a fragmentary top plan view of the filling machine with parts broken away to illustrate details of construction;

Fig. 4 is a fragmentary end elevational view of the filling machine;

Fig. 5 is a fragmentary side elevational view of the container feed magazine;

Fig. 6 is a fragmentary sectional view taken on the plane 6—6 of Fig. 4;

Fig. 7 is a side elevational view of the opening and closing mechanism illustrating the advance of containers thereby;

Fig. 8 is a fragmentary sectional view taken on the plane 8—8 of Fig. 2;

Fig. 9 is a fragmentary vertical sectional view taken on the plane 9—9 of Fig. 2;

Fig. 10 is a fragmentary vertical sectional view taken on the plane 10—10 of Fig. 2;

Fig. 11 is a fragmentary horizontal sectional view taken on the plane 11—11 of Fig. 2;

Fig. 12 is a fragmentary vertical sectional view taken on the plane 12—12 of Fig. 2;

Fig. 13 is a fragmentary horizontal sectional view taken on the plane 13—13 of Fig. 2;

Fig. 14 is a top plan view of a pusher for one-quart cartons;

Fig. 15 is a side elevational view of the pusher shown in Fig. 14;

Fig. 16 is a side elevational view of a pusher for pint and half-pint cartons;

Fig. 17 is a side elevational view of a pusher for two-quart cartons;

Fig. 20 is a schematic wiring diagram of the electrical controls for the filling machine;

Fig. 21 is a diagrammatic view illustrating the hydraulic and electrical controls for the filling machine;

Fig. 22 is a diagrammatic view illustrating the hydraulic and electrical controls for a manually operated filling machine;

Fig. 23 is a diagrammatic view illustrating the arrangement of the two-quart sized cartons in the filling machine;

Fig. 24 is a diagrammatic view illustrating the arrangement of the one-quart sized cartons in the filling machine;

Fig. 25 is a diagrammatic view illustrating the arrangement of the half-pint sized cartons in the filling machine;

Fig. 26 is a front end elevational view illustrating the support track and guide rails arranged to handle one-quart sized cartons;

Fig. 27 is a front end elevational view illustrating the support track and guide rails arranged to handle two-quart sized cartons; and Fig. 28 is a front end elevational view illustrating the support track and guide rails arranged to handle pint and half-pint sized cartons.

Figure 18:
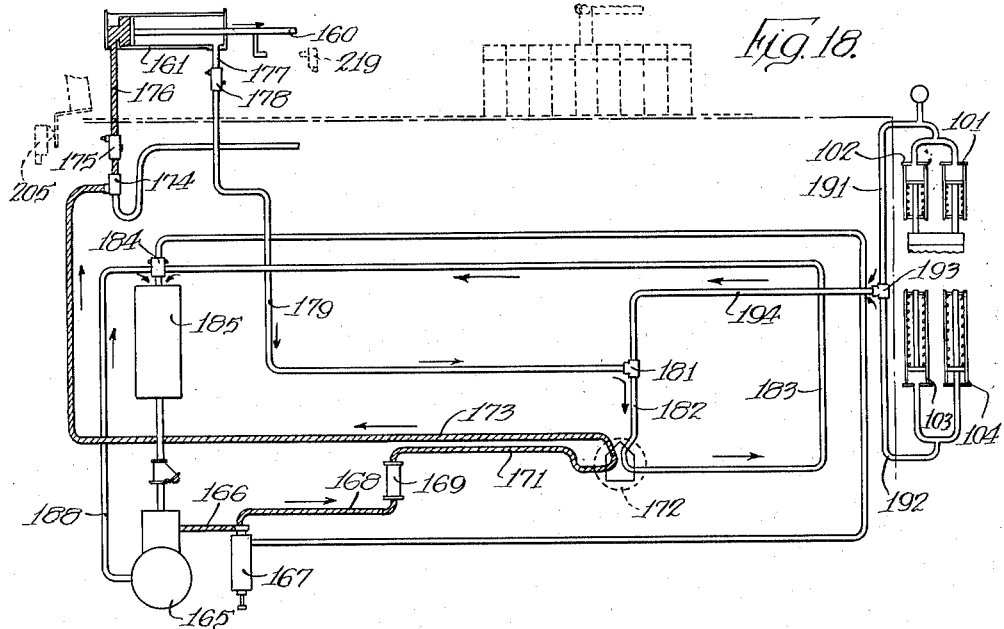
Fig. 18 is a diagrammatic view of the hydraulic control circuits for the filler machine, showing the control valve in one position thereof.

Referring more specifically to the accompanying drawings, the filling machine comprises a base including a table 21 having depending legs 22 which may be conveniently supported at the lower ends thereof on casters 23 to facilitate maneuvering the filling apparatus into proximity to the processing machinery which supplies the liquid. A plurality of shelves 24 and 25 are secured to the legs below the table 21 to support the filling machine operating mechanism, to be described more fully hereinafter.

In accordance with the present invention, the containers are arranged in a row in sidewise abutting relation and advanced in step fashion past the filling and sealing instrumentalities by a pusher mechanism. For this purpose a plurality of upstanding posts 27–30 inclusive are secured to the table top 21 and extend upwardly therefrom. A pair of guide rails 32 and 33 are attached to the post in vertical spaced relation to the table top and arranged to guide the containers therebetween. A pusher indicated generally by the numeral 34 is reciprocably mounted on the rails 32 and 33 adjacent one end thereof and arranged to engage the endmost carton or container in the row of containers disposed between the guide rails 32 and 33 to advance the row of containers in step fashion. More specifically, the pusher includes a slide 35 which overlies the upper edges of the guide rails 32 and 33 and an actuating rod 36 secured to one end of the slide. The actuating rod extends from the slide along the upper edge of the guide rail 33 and is operatively connected at its other end, in a manner described more fully hereinafter, to a drive mechanism which reciprocates the slide. A plurality of interchangeable pusher plates 37 (see Figs. 14–17) are provided and detachably secured to the slide 35, by means of wing nuts 40, which pusher plates are shaped in a manner set forth more fully hereinafter to accommodate containers or cartons of different size.

A support track 38 is provided for supporting the containers during movement between the guide rails which support track is attached to the posts 27–30 for vertical adjustment toward and away from the guide rails to accommodate containers having different heights. The filling machine is particularly designed to handle preformed paper cartons, which cartons have a heavy wax coating on the surface thereof. In order to reduce the frictional drag between the carton bottoms and the track, the track is channeled or ribbed to reduce the area of contact between the track and cartons. As best shown in Figs. 4–8, the support track is in the form of an elongated plate 39 which has a depressed central portion extending along the length thereof so that the bottom of the cartons engage the track in substantially line contact only along the side edges of the carton bottoms. Depending reinforcing flanges 41 are provided along opposite edges of the track and a pair of rods 42 extend through the depending flanges 41 on the track. Each of the rods 42 are similarly formed and have a hook 43 on one end thereof arranged to engage one of the posts, such as 29. A plate 44 is secured as by fastener 45 to the other end of the rod 42 and carries a thumb screw 46 which is engageable with the other post, such as 30, to thereby adjustably clamp the track to the post. In this manner, the vertical position of the support track may be adjusted for the different size containers so that the upper ends of the containers may bear a predetermined relation to the pusher 34 and the other instrumentalities such as the filling mechanism and the sealing mechanism, thereby adapting the filling machine to accommodate containers of different height.

The filling mechanism of the present invention is designed to accommodate the different size preformed paper cartons including the half pint, pint, quart and two-quart sizes. It is necessary to guide these cartons against relative lateral displacement to assure that the corners of sidewise adjacent cartons are in abutting relation and to prevent the corner of one carton from pressing against the face of an adjacent carton in the row. As these containers or cartons differ in cross section, provision is made for adjusting the spacing between the carton guides. Advantageously, the guide rails 32 and 33 are spaced apart a distance such as to slidably receive the largest container to be handled by the machine which, in the present filling machine is the two-quart size carton and guide bars 48 and 49 are attached to the registering faces of the rails 32 and 33 to guide the smaller cartons. As shown in the drawings, the filling machine is arranged to fill the one-quart size and for this purpose the guide bars 48 and 49 are detachably secured as by bolts and wing nuts 51 to the guide rails 32 and 33 respectively. The width of the bars 48 and 49 is such that the space therebetween, when the latter are secured to the guide rails, will slidably receive the one-quart size cartons, and conveniently the thickness of the guide rails 32 and 33 may be made equal to the width of the guide bars so that the latter may be detached from the guide rails and secured to the posts 27–30 (see Fig. 27), as by inserting the bolts and wing nuts 51 through openings 52 in the posts. In this manner, the bars 48 and 49 may be used while filling two-quart sized containers to guide the lower ends of the cartons.

In order to guide the lower ends of the one-quart size containers, a guide channel 53 is detachably secured as by fasteners 54 to the guide track 38. A pair of upstanding fingers 55 are secured to the sides of the guide track adjacent the container loading station to laterally guide the lower ends of the containers as they are fed into the filling machine between the guide rails and in advance of the pusher.

The filling mechanism indicated generally by the numeral 58 may be of any conventional construction which dispenses a measured quantity of liquid at each actuation thereof and conveniently may be of the type disclosed in the patent to A. B. Mojonnier, Re. 23,830. Briefly, the filler mechanism disclosed in that patent comprises a tank 59 having a discharge nozzle 61 and a normally closed valve 60 which controls the flow of liquid through the nozzle, which valve is operated to its open position by a solenoid 62 and is retained in its open position as long as the solenoid remains energized. A float controlled mechanism (not shown) is provided in the tank to control the admittance of fluid thereinto and is arranged to maintain a substantially constant level in the tank so as to thereby provide a controlled rate of discharge through the nozzle 61.

The tank 59 is provided with depending legs 63 attached to the tank support bar 64 for adjustment longitudinally thereof. One end of the tank support bar is secured to the upper end of the post 28 and the other end of which is attached to an auxiliary support post 65 carried by the guide rail 33. The discharge nozzle 61 of the tank is positioned in vertical spaced relation to the rails 32 and 33 and disposed medially therebetween so as to dispense the liquid into the containers between the rails and a drip pan 66 is supported on the nozzle 61 in overlying relation to the guide rails to collect the condensate from the tank 59 and discharge the same through an opening 67 in the pan at one side of the guide rails, thereby preventing the condensate from driping into the opened containers.

The preformed cartons 70 which are commonly employed in the packaging of milk products and which the present filling machine is particularly designed to handle, are formed of cardboard and have a square horizontal cross section and a flat bottom. The top closure includes opposed inclined panels 70a and 70b which terminate in closure flaps 70c and 70d which, when closed, form a central transverse rib which gives the tops of the closed containers the appearance of a gabled structure. Such containers are hereinafter referred to as gabled top containers and, as fed into the filling machine are preformed with the gabled top closed but not sealed. Provision is made for opening the gabled top containers as the latter are advanced from the container loading station to the filling mechanism by the pusher and for thereafter closing the gabled top containers as the latter are advanced to the sealing mechanism.

These cardboard containers are waxed to render them liquid proof, and it is essential that the cartons be handled in such a manner as to avoid excessive deformation of the cartons, which would damage the cardboad containers and crack the wax coating thereby causing the cartons to leak. In using a pusher to advance the row of cartons, it has been found essential to satisfactory operation to minimize the frictional resistance imposed to the advancement of the cartons by the support track and by the several instrumentalities which operate on the cartons as they are advanced along the track, since the resistance to advancement of all the cartons in the row are additive and the pusher must push against the end carton in the row with sufficient force to move the entire row of cartons. As hereinbefore set forth, the support track is shaped to provide substantially line contact with the bottoms of the cartons to minimize the frictional resistance between the waxed bottoms of the cartons and the track. The opener and closer assembly, designated generally by the numeral 68, is also formed and shaped to reduce the frictional contact with the gabled tops of the cartons. In general, the opener and closer are arranged to successively contact the gabled tops of the containers to perform their respective functions, and the entire assembly made relatively short in length to thereby permit the sealing mechanism, to be described hereinafter, to be located close to the filler mechanism. This reduces the number of cartons between the pusher and the sealing mechanism so as to also aid in reducing the frictional resistance imposed to the advance of the row of cartons by the pusher, and additionally provides a relatively short filling machine which can be easily moved into proximity to the milk processing machine.

The opener and closer assembly 68 is secured to a support plate 69 attached by suitable fasteners to the upper end of the posts 27 and to the under side of the tank support bar 64. The opener and closer 68 is provided with a support arm 71 which is attached to the support plate 69 for adjustment longitudinally thereof by bolts 72. The bolts extend through slots 73 in the plate and wing nuts 74 are provided to clamp the opening and closing assembly in its adjusted position.

The opener comprises a wedge shaped member 75 which is secured to the support arm 71 with the point thereof extending towards the pusher 34. A guide block 76 is mounted on the support arm 71 and is formed with a V-shaped notch therein which extends downwardly and forwardly, in the direction of movement of the cartons, towards the tip of the opener to guide the ribbed top of the gable top container onto the tip of the opener 75 so that the latter enters the peak of the gable. To facilitate guiding the peak of the gabled top onto the opener 75, a carton guide bar 77 is mounted on the container support track 38 and extends downwardly and forwardly in the direction of movement of the containers by the pusher. The guide bar 77 is located so that the lower end thereof is spaced rearwardly from the tip of the opener 75 a distance less than the depth of one of the containers whereby the containers, as they are fed to the opener, are inclined upwardly and rearwardly as shown in Fig. 7. This facilitates the entrance of the tip of the opener into the peak of the gabled top of the container, as the containers are advanced past the opener by the pusher mechanism, whereby the gabled ends of the containers are opened. The sides of the wedge shaped member 75 spread the inclined panels 70a and 70b of the gabled end of the container open, as the cartons move thereby, and maintain the same spread apart as the container moves past the filler nozzle 61. An opening 78 is provided in the opener plate 75 to permit discharging of the liquid from the filler nozzle 61 therethrough into the containers.

A closer assembly is affixed to the opposed end of the wedge shaped member 75 and is constructed so as to minimize the contact area between the closer assembly and the gabled tops of the cartons and reduce the frictional resistance imposed thereby to the advance of the cartons. The closer assembly includes upper and lower triangular shaped plates 81 and 82 respectively which are spaced apart by a spacer 83 and secured to the member 75 by wing nut 80. The plates 81 and 82 have opposed guide edges 84 and 85 respectively which are adapted to engage the outer and inner closure flaps 70d and 70c respectively on the gabled top of the container, as best shown in Fig. 10. The upper plate 81 has one edge thereof bent upwardly as shown at 86 in Fig. 11 to guide the inner closure flap 70c between the upper and lower guide plates and shaped presser fingers 87 and 88 are mounted by arms 89 and 91 respectively on a block 92 for adjustment laterally and vertically relative to the plates 81 and 82. The presser fingers 87 and 88 are arranged to engage the opposed upwardly inclined panels 70a and 70b on the gabled top and urge the latter respectively into engagement with the guide edges 84 and 85 and are shaped to have only a small area in contact with the panels 70a and 70b to reduce the resistance to the advance of the cartons thereby. Since the inner flap 70c is interposed between the plates 81 and 82 and the outer flap 70d overlies the plate 81, the flaps are interleaved as shown in Fig. 10, as the containers are advanced past the presser fingers 87 and 88, thereby closing the gabled end of the carton. A guide arm 90 is secured to the under side of the support plate 69 as by the bolt and thumb screw 92 and overlies one edge of the opener plate 75 to guide the inner flap of the carton, as it leaves the opener plate, between the spaced plates 81 and 82. Presser shoes 93 and 94 are mounted on the guide rails 33 and 32 respectively for adjustment laterally thereof and positioned in the path of movement of the cartons as they emerge from the closing mechanism. The shoes 93 and 94 engage the upwardly inclined panels in the gabled tops of the cartons and retain the latter in their closed position as they move from the closer mechanism to the sealing mechanism to be described more fully hereinafter.

A sealing mechanism indicated generally by the numeral 97 is mounted in the path of movement of the containers as they are advanced between the guide rails 32 and 33 and operated in timed relation therewith to effect sealing of the containers. As shown in the drawings, the sealing mechanism comprises a stapler mechanism arranged to affix a staple or staples to the ribbed top of the containers. The stapler includes four stapler cylinders 101—104 mounted in opposing pairs on a mounting plate 105 which is secured to a mounting plate bar 106 carried by the upper ends of the posts 29 and 30. A block 107 is secured to the under surface of the mounting rail 105 medially between the guide rails 32 and 33 and is formed with a downwardly opening Y-shaped notch 108 which flares outwardly at the leading end thereof for the reception of the rib along the top of the gabled cartons. The block is formed with recesses 109 intermediate the ends thereof (see Fig. 2) which communicate with the notch 108. A pair of stapling heads 111 and 112 are secured to the mounting plate and extend into the recesses 109 with the slides 111a and 112a thereof arranged for engagement by the pistons 103a and 104a of the stapling cylinders 103 and 104 respectively. The stapling heads are of conventional construction and are provided with magazines 113 and 114 which feed staples thereto. A presser bar 115 is reciprocably carried by the plungers 116 and 117 on the stapler cylinders 101 and 102 respectively and is provided with a serrated edge 118 adapted to engage the rib on the gabled top of the cartons. A pair of clincher plates 119 are mounted in recesses in the presser bar 115 and affixed thereto by suitable fasteners 121, which clincher plates, as is conventional, deflect the ends of the staples driven through the rib on the cartons by the stapler heads 111 and 112. As best shown in Fig. 4, a bore 122 is provided in the presser bar 115 for the reception of a complementary formed heater unit which may be inserted thereinto to heat the presser bar and thereby melt the wax along the rib on the carton to form a seal thereat during the stapling operation.

After the cartons are closed, it is necessary to press the closure flaps and the upper portions of the inclined panels together to form a compact rib ready for stapling. This is accomplished without increasing the resistance to the advancement of the row of cartons by means of a depressor assembly indicated generally by the numeral 124. This assembly includes an arm 125 vertically pivotally mounted on a pin 126 on the block 107, which arm carries a downwardly opening Y-shaped shoe 127 which is movable with the arm in a vertical plane medially between the guide rails. The shoe 127 is normally biased out of operative engagement with the gabled ends of the cartons by a spring 128 and is operated, in timed relation with the advance of the containers, into engagement with the rib along the top of the cartons to depress the latter so that it may enter the notch 108 in the block 107. For this purpose, a guide bracket 131 is secured to the end of the operating rod 36 remote from the pusher and a laterally extending cam lip 132 is formed on the guide bracket. A follower is attached to the arm 125 and includes a roller 133 mounted on the pin 134, which roller is adapted to engage the outer surface of the cam lip 132 as the operating rod 36 is reciprocated in a direction to advance the cartons to thereby elevate the shoe 127. The under surface of the cam lip 132 engages the roller 133 as the operating rod is retracted and thereby urges the arm 24 and the shoe 127 downwardly into engagement with the rib on the gabled top of the cartons. This depresses the rib along the top of the containers and presses the outer flap 70d downwardly against the outside of the gabled top whereby the containers, when next advanced by the pusher mechanism, will be guided into the slot 108.

The paper cartons, after being filled, tend to bulge out of the normally rectangular shape thereof, the amount of the bulging of the cartons varying with the number of containers in the row which is pushed by the pusher 34. In order to accurately position the cartons at the stapler 97 as the cartons are advanced past the stapler, there is provided a stop mechanism operated in timed relation with the advance of the cartons for accurately stopping the cartons in position at the stapler. As best shown in Figs. 3, 11 and 12, the stop mechanism includes a stop arm 135 secured to a shaft 136 supported by trunnions 137 on the guide rail 133, which arm swings in a vertical plane into and out of the path of the advancing cartons. A lever 138 is affixed to one end of the shaft 136 and a spring 139 has one end thereof attached to the lever and the other end attached by a bracket 141 to the post 30 to yieldably urge the stop arm 135 to its inoperative position. A cam operated lever 142 is secured to the other end of the shaft 136 and disposed in the path of movement of the cam 143 carried by the actuating rod 36, which cam engages the lever 142 and pivots the latter, as shown in Fig. 12 in a clockwise direction to thereby move the stop arm 138 into the path of advance of the cartons. When a carton strikes the stop arm, movement thereof is arrested and further movement of the pusher 34 serves only to compress the cartons disposed between the stop arm and the pusher.

Provision is made for automatically feeding cartons from a carton magazine to the space between the guide rails 32 and 33 and in advance of the pusher 34 in timed relation with the operation of the pusher. For this purpose, a downwardly and forwardly inclined channel shaped carton magazine 144 (see Figs. 5 and 6), preferably of a width corresponding to the width of the cartons being fed to the machine, is mounted on the support brackets 145 and 146. The latter are attached to an extension 147 on the guide rails 32 and 33 and which may advantageously be formed integrally therewith. The magazine supports the cartons in sidewise abutting relation thereon so that the cartons move sidewise therealong by gravity. A front wall 148 is provided on the magazine and supported by the side plate 149 thereon, which front wall is inclined downwardly and forwardly at a relatively sharper angle than the angle of inclination of the magazine 144. The upper end of the front wall 148 has a lip 151 thereon adapted to engage the upper corner of the lowermost carton in the magazine and prevent movement of the carton along the magazine, the lower end of the front wall terminating in spaced relation to the lower end of the magazine to provide a discharge opening 152 therebetween. A feeding finger 153 is attached by a mounting bracket 154 to the slide 35 of the pusher 34 for movement therewith. The finger 153 is arranged to extend through a slot 155 in the bottom of the magazine 144 and to engage the bottom of the lowermost carton as the pusher is reciprocated in a direction to advance the cartons between the guide rails 32. The slide 35, however, as it is moved to advance the cartons, underlies the discharge opening 152 and prevents discharging of the carton until after the slide is retracted at which time the carton may then drop by gravity through the discharge opening 152 into the space between the guide rails in advance of the pusher and rearwardly of the row of cartons between the guide rails 32 and 33. The carton guide bar 77, as previously described, engages the lower end of the carton so that the carton is inclined upwardly and rearwardly in advance of the pusher. Upon the subsequent actuation of the pusher, the gabled end of the carton is advanced against the tip of the opener member 75 to thereby open the carton as the latter is advanced to the filling station.

The paper cartons, as preformed, are coated on the surface thereof with a heavy layer of wax or the like. The wax layer on the gabled top of the containers reduces the flexibility thereof and also tends to collect on the closer mechanism and impedes movement of the cartons thereby. In order to overcome this difficulty and also to promote sealing of the cartons after they have been filled, one or more heat lamps 156 are supported, as on brackets 157 and 158, and directed against the cartons and against the closer assembly to heat the wax coating on the cartons to facilitate reclosing and sealing the same and also heat the closer assembly to prevent the buildup of wax deposits thereon. Although other types of heaters may be used, the heat lamp has been found advantageous in practice since it heats both the closer assembly and the top of the cartons while providing illumination to aid in checking the liquid level in the cartons. A spray of water or the like may be introduced through a conduit 159 and sprayed against the sealed cartons as they emerge from the stapler to thereby wash off any milk or the like which may be on the outside of the cartons.

Figure 19:
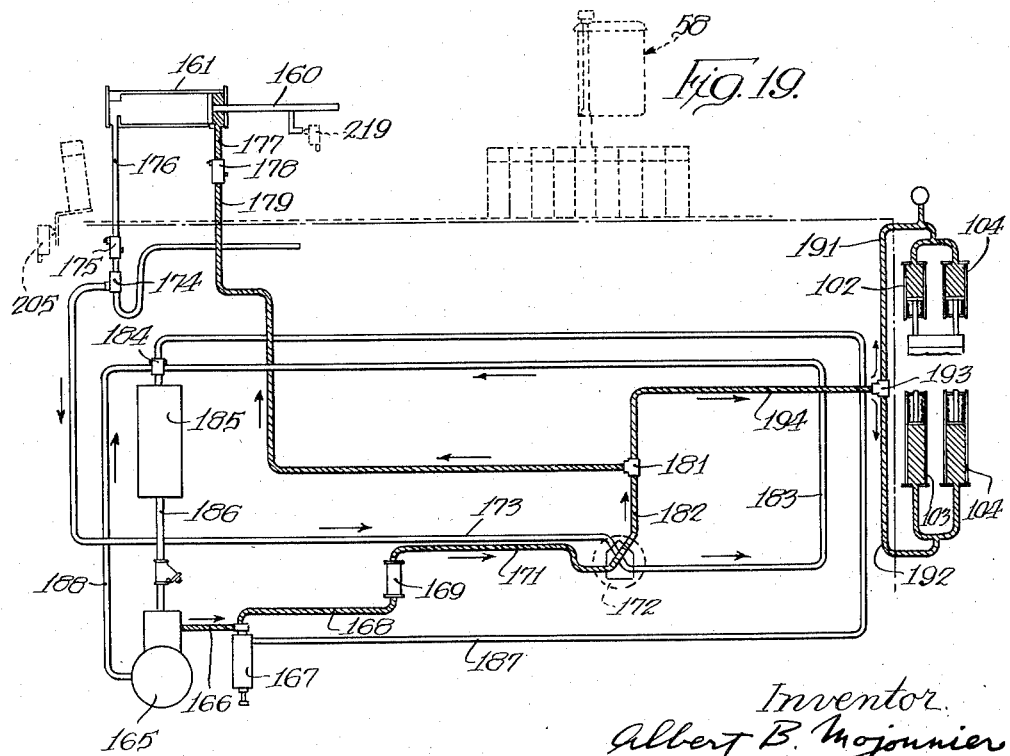
Fig. 19 is a diagrammatic view of the hydraulic control circuits for the cycling machine showing the control valve in the other operational position thereof.

The pusher, the staplers and the fillng mechanism are operated in timed relation with each other by a combination electrical and hydraulic control circuit. The pusher is operated from a double acting piston 160 disposed in the cylinder 161 which is mounted on the mounting bar 64, which piston is adjustably connected by nuts 162 to an arm 163 attached to the pusher actuator bar 36. As best shown in Figs. 18 and 19, hydraulic pressure is applied to the cylinder 161 from a pump 165 which delivers fluid through a conduit 166 to a pressure regulator 167, the regulated output from the pressure regulator flowing through conduit 168, filter 169 and conduit 171 to a two-position valve 172. In one position of the valve shown in Fig. 18, fluid is delivered from conduit 171 through conduit 173, an air bleed valve 174, an adjustable throttling valve 175 to control the speed of advance of the pusher, and through conduit 176 to one end of the cylinder 171. The other end of the cylinder 171 is connected through conduit 177, adjustable throttling valve 178, conduit 179, T-coupling 181, conduit 182, through valve 172 and conduit 183 to the coupling 184 which is communicated with the fluid reservoir 185. As is conventional, fluid from the reservoir is supplied through a conduit 186 to the pump 165, and a by-pass 187 is provided for by-passing fluid from the pressure regulator 167 through coupling 184 to the reservoir 185. A pump by-pass conduit 188 is provided to prevent excess fluid pressure buildup in the pump. Each of the pistons 101a, 102a, 103a and 104a in the stapling cylinders 101—104 are yieldably biased by springs to their retracted positions. The stapling cylinders are connected by conduits 191 and 192, T-connection 193 and conduit 194 to the T-coupling 181 so that when the valve 172 is in the position shown in Fig. 18, each of the stapling cylinders are communicated with the reservoir 185 through conduits 191 and 192, conduit 194, T-coupling 181 and conduit 182 thereby permitting the springs to urge the respective stapling pistons to their retracted positions.

The valve 172 is operated, in a manner to be described more fully hereinafter from the position shown in Fig. 18 to the position shown in Fig. 19 in which the conduit 171 from the discharge side of the pump is connected to conduit 182. Pressure is then applied through conduit 179, throttling valve 178 and conduit 177 of the right hand end of the cylinder 161 to thereby urge the piston 160 to the retracted position thereof, the other end of the cylinder being connected through conduit 176, flow restricting valve 175, conduit 173 and valve 172 through conduit 183 to the reservoir. Simultaneously, pressure is applied from conduit 182 through conduits 194, 191 and 192 to each of the stapling cylinders 101—104 to thereby urge the opposed pairs of pistons towards each other in a stapling operation.

Valve 172 may be of any conventional construction and is operated from one position, such as that shown in Fig. 18 to a second position such as that shown in Fig. 19 and back, by means of a pair of solenoids 201 and 202. These solenoids are controlled by a circuit shown schematically in Fig. 20.

As the machine is intended for use in filling containers of different sizes, including half-pint, pint, quart, and two-quart cartons, in which the time required for filling varies in accordance with the size of the carton, provision is made for controlling the cycling of the filling machine in such a manner that each successive operation is initiated in response to the completion of the preceding operation. In this manner, accurate control of the sequence of operation is maintained and the time required to complete a cycle of operations is minimized since it is unnecessary to provide a time delay between the various phases of the cycle to assure completion thereof as is necessary when a program control is used.

Each cycle of operations of the filling machine is initiated by a normally open switch 205 hereinafter referred to as the track switch. The switch 205 is mounted by an L-shaped bracket 206 on one end of the container support track 38 and an L-shaped operating arm 207 extends through a slot 208 in the mounting bracket 206 and is pivotally supported thereon with one leg thereof in engagement with the actuator 209 of the switch and the other leg extending over the track 38 adjacent the container loading station. The switch 205 is arranged to be closed when an empty container is fed at the loading station in advance of the pusher 34 so that the bottom of the carton engages the operating arm 207. When the switch 205 is closed, power is applied from the power input conductor 211, through conductor 212, switch 205, conductor 213, relay controlled switch 214 of relay 215 and conductor 216 to the valve operating solenoid 201. The solenoid 201 is otherwise connected through conductor 217 to the other power input conductor 218.

The valve 172 is initially in the position shown in Fig. 19 in which pressure is applied to the right hand end of the cylinder 161 and the piston is urged by the fluid pressure therein to its retracted position. Simultaneously, pressure is applied to the stapling cylinders 101—104 whereby opposed pairs of stapling pistons are moved towards each other to clamp and staple the ribbed top of the carton therebetween. When the solenoid 201 is energized in response to closing of the switch 205, the valve 172 is operated from the position shown in Fig. 19 to the position shown in Fig. 18 thereby applying fluid pressure to the left hand end of the cylinder 161 and connecting the righ hand end of the cylinder 161 and each of the stapling cylinders to the sump side of the pump 165. The piston 160 is urged to the right under the fluid pressure in the cylinder 161 thereby extending the pusher 34 to advance the row of cartons between the guide rails 32 and 33.

After the pusher has advanced a preselected distance, provision is made for reversing the application of hydraulic pressure to the cylinder 161 to thereby retract the pusher. For this purpose a switch 219 is mounted on a support 221 adjacent the guide rail 33 and a switch operating button 222 is reciprocably mounted in the post 28 for movement into and out of engagement with the switch actuator 223. A yieldable switch operating finger 225 is reciprocably mounted in a block 226 carried on the slide 35, which operating finger is arranged to engage the button 222 when the slide is in its extended position to thereby operate the switch 219. The operating finger is adjustable longitudinally relative to the block by means of a wing nut 227 and is yieldably urged to its extended position by a spring 228. Thus, when the pusher moves to its extended position, the finger 225 moves the button 222 into engagement with the switch actuator 223 to thereby close the normally open switch 219.

Switch 219 is connected through conductors 229 and 230 to the input terminals 231 and 232 on the disconnect plug 233 which is connected to an interval timer 234. Various commercially available interval timers may be used to control energization of the filler solenoid 62 for a selectively variable time interval after actuation of the timer, details of which timers form no part of the present invention. Briefly, the timer 234 is arranged so that the timing cycle is initiated in response to closing of a switch such as 219 across its input terminals, the timer then being operative to apply power from the power input conductors 235 and 236 to its output terminals 239, 240 and 241 for a selectively variable time interval determined by the setting of the control knob 234a on the timer. As shown in Fig. 20, the power input conductors 235 and 236 for the timer are connected by a plug 237 to an outlet 238 which may conveniently be supported on the filling machine. The outlet 238 is connected through conductors 261 and 262 to the power input conductors 211 and 218. At the end of the time interval, power to output terminals 239, 240 and 241 of the timer is interrupted until the succeeding actuation of the switch at which the timer again applies power to its output terminals for the aforementioned predetermined time interval.

The timer output terminals 239, 240 and 241 are respectively connected through conductors 242, 243 and 244 to the receptacle 245. A mating plug 246 is provided and connected through conduits 247, 248 and 249 to the filler valve operating solenoid 62. The filler solenoid 62 is thus energized for a time interval determined by the timer 234 to open the filler valve 60 and maintain the latter open for the measured time interval to thereby dispense a predetermined quantity of liquid into the container therebelow.

Conductors 242 and 243 are also connected through conductors 251 and 252 to the coil 253 of the relay 215 so that the relay 215 is energized for the time interval during which the filler solenoid is energized from the timer. Energization of the relay 215 opens the relay controlled switch 214 thereof and closes the relay control switch 254. Switch 214 is interposed in the circuit to the valve operating solenoid 201 so that the latter cannot be energized when the relay 215 is energized during the filling cycle whereby subsequent closing of the track switch 205 cannot effect operation of the solenoid 201 while the filler valve is open. Closing of relay controlled switch 254 applies power from the input conductor 211 to conductor 255, switch 254 and conductor 256 to the valve operating solenoid 202, which solenoid is otherwise connected through conductor 257 to the power input conductor 213. In this manner, initiation of the timing cycle in response to closing of switch 219 also effects energization of valve operating solenoid 202 to thereby move the valve from the position shown in Fig. 18 to the position shown in Fig. 19. This reverses the application of hydraulic pressure to the cylinder 161 and effects movement of the piston 160 to its retracted position and simultaneously applies hydraulic pressure to the stapling cylinders 101—104 to effect closing movement of the stapling pistons and stapling of the ribbed top of the cartons. Since, as previously mentioned, the relay 215, when energized, disconnects power to the solenoid 201, it is apparent that the valve 172 will not again be operated to the position shown at Fig. 18 until after the completion of the timing cycle at which time the filler coil 62 is de-energized. Therefore, the feeding of an empty carton in advance of the pusher 34 will not initiate a new cycle of operations until after the completion of the filling cycle.

The pump 165 is arranged for continuous operation from a motor 258 which is energized through conductors 259 and 260 through a disconnect switch 263. Any excess hydraulic pressure produced due to continuous operation of the pump 165 is by-passed through conduit 188.

As previously described, it is necessary to reduce, as much as possible, the resistance presented by the row of cartons to advancement by the pusher in order to prevent excessive deformation to the cartons which would damage the latter. To this end, the length of the filling machine, and in particular the distance between the pusher and the sealing mechanism, is made as short as practicable to reduce the number of cartons in the row which must be advanced by the pusher.

In order to adapt the filling machine to handle both quart and two-quart cartons which have different lengths, the distance between the filler and the stapler is preferably made such that when either a stack of two-quart cartons or a stack of one-quart cartons are arranged in the filling machine, with the carton at one end of the stack in proper position below the stapler mechanism, the carton at the other end of the stack would be substantially in proper position below the filler mechanism. As best shown in Figs. 23 and 24, the dimensions of the quart and two-quart size cartons are such that a stack of five two-quart cartons, designated $d_3$—$d_7$ inclusive in Fig. 23 has an overall length substantially equal to a stack of seven quart cartons designated $c_3$—$c_9$ inclusive (see Fig. 24). The spacing between the stapler and the filler is therefore preferably made such that when one of the two-quart cartons is below the filler, the fourth carton preceding the carton at the filler, is below the stapler. In handling the one-quart size cartons with this spacing between the filler and stapler, when one of the one-quart cartons is at the filler, the sixth preceding quart carton is located at the stapler. Any minor difference between the lengths of the two stacks is accommodated by adjustment of the filler mechanism along the tank support bar 64. As the pint and half-pint have substantially the same cross section as the quart size cartons, the aforementioned spacing will also accommodate these cartons. As shown in Fig. 25, a stack of seven half-pint cartons $e_3$—$e_9$ arranged in the filling machine, will extend from the filler to the stapler.

The opener and closer assembly is also adjustable longitudinally of the track by means of the fasteners 74 to maintain the opener and closer in proper relation to the filler. The wedge shaped opener member 75 extends from the filler nozzle 61 towards the pusher 34 and has a length greater than the length of one of the cartons. The limits through which the pusher reciprocates is made such that when the pusher is in its extended position, one carton is disposed between the pusher and the carton below the filler. The length of this carton in advance of the pusher, designated $d_2$ in Fig. 23, $c_2$ in Fig. 24 and $e_2$ in Fig. 25, will depend on the carton size. The several pusher plates 37, which are provided for handling the different size cartons, are shaped to accommodate this difference in carton length so that the pusher may reciprocate between substantially the same limits for all of the different carton sizes.

The pusher plate for use with the quart size cartons is illustrated in Figs. 14 and 15 and includes an attaching lip 264 which is detachably secured to the slide 35 by fasteners 40. A depending blade 266 is formed on the lip forwardly of the slide. The blade is slidably received between the guide rails 32 and 33 and has notches 267 therein for the reception of the guide bars 48 and 49. A depending finger 268 is provided on the lower end of the blade for engagement with the lower end of the cartons to advance the latter along the track. The spacing between the blade 266 and the forward edge of the slide is such that the pusher, when in its extended position will advance a quart carton designated $c_2$ in Fig. 24 to a position in which the eighth preceding carton $c_9$ is in proper position below the stapler 97. Fine adjustment of the position to which the end carton $c_9$ in the row will be advanced is made by adjusting the actuating finger 225 which controls the position of the pusher at which the switch 219 is energized. As previously described, switch 219, upon being closed, effects retraction of the pusher.

The pusher plate 37 for the two-quart size cartons is illustrated in Fig. 17 and includes an attaching lip 270 which is detachably secured by the fasteners 40 to the slide. The blade 271 depends from the attaching lip forwardly of the slide 35. The spacing between the blade 271 from the forward edge of the slide 35 is made less than the spacing between the blade 266 of the quart size pusher plate and the slide by an amount such that when the pusher advances to its extended position, the sixth preceding two-quart carton will be in proper position below the stapler 97. As in the pusher plate for the quart size cartons, a depending finger 273 is provided on the blade 271 to engage the lower ends of the cartons.

The pusher plate for the pint and half-pint cartons is illustrated in Fig. 16 and includes an attaching lip 275 and a blade 276. These cartons have substantially the same cross section as the quart cartons and accordingly the blade 276 is spaced forwardly of the slide a distance equal to the spacing of the blade 266 for the quart cartons. However, because of the shorter length of the pint and half-pint cartons, it has been found advantageous to extend the blade 276 upwardly so as to engage the gabled tops of the cartons when pushing the latter through the filling machine.

The operational sequence of the filling machine will best be understood by reference to the diagrammatic illustration of the hydraulic and electrical controls shown in Fig. 21. For convenience, the operation of the filling machine when handling only quart size cartons will be described, it being understood that the operation is the same when filling other size cartons. When a carton is dropped onto the track, the switch 205 is closed thereby energizing the valve operating solenoid 201 to move the valve 172 from the position shown in dotted lines in Fig. 21 to the position shown in solid lines. Fluid pressure is then applied to the operating cylinder 161 which urges the piston 160 to its extended position. This causes the pusher 34 to advance and move the empty carton forwardly against the row of cartons disposed between the guide rails 32 and 33 to thereby advance the latter. The pusher advances under hydraulic pressure until it actuates the fill switch 219, which switch initiates operation of the timer 234. As previously described, the timer simultaneously energizes the solenoid 62 to open the valve 60 in the filling mechanism and also energizes the coil 253 of relay 215, and maintains the latter energized during the filling cycle. Energization of relay 215 closes the switch 254 thereof to thereby operate the solenoid 202 and move the valve 172 from the position shown in solid lines in Fig. 21 to the dotted line position. This causes the plunger 160 to be urged under hydraulic pressure to its retracted position. Movement of the valve 172 to its dotted line position also applies hydraulic pressure to the stapling cylinders 101—104 whereby the container which is located at the stapling mechanism has the ribbed top thereof gripped between the stapling jaws and a staple affixed thereto. In the quart, pint and half-pint sizes, only one staple is utilized to close the gabled top of the containers, and accordingly the staples are removed from one of the magazines such as 113 so that only the stapler associated with magazine 114 is operative to effect stapling.

The pusher 34 thus reciprocates between predetermined limits, the distance through which the pusher reciprocates being made greater than the width of the cartons to be advanced thereby. As the carton such as $c_1$ (see Figs. 7 and 24) is dropped in front of the pusher, the carton guide bar 77 causes the lower end of the carton to move forwardly so that the carton slants upwardly and rearwardly. During the initial movement of the pusher 34 towards its extended position, the pusher engages the carton adjacent the juncture between the side walls and the gabled top and moves the carton forwardly until the ribbed top engages the tip of the wedge shaped member 75, further movement of the pusher causing the carton to move along the opener 75 until it engages the carton $c_2$. Continued extension of the pusher then causes the row of cartons $c_1$—$c_9$ to advance one step equal to the length of the carton $c_1$, at which position of the pusher the switch 219 is actuated to retract the pusher. Thus, the opening of the carton $c_1$ occurs before that carton engages the preceding carton in the row. This is advantageous in that the force which must be applied to the carton $c_1$ by the pusher to unfold the flaps on the carton and open the gabled top thereof does not occur during advancement of cartons $c_2$—$c_9$ so that the peak compressive force on the carton $c_1$ is reduced. Obviously, if carton $c_1$ abutted against carton $c_2$ before engaging the opener 75, the pusher would have to apply a force to carton $c_1$ which would be sufficient to overcome both the resistance imposed by cartons $c_2$—$c_9$ to advancement and the resistance of the opener acting on carton $c_1$ to unfold the closure flaps thereon.

Since an empty carton such as $c_1$ shown in Fig. 24 is fed in front of the pusher before the latter is extended, it is apparent that the row of cartons between the guide rails, in advance of the carton being fed thereto, is moved a distance corresponding to the length of the carton fed to the pusher. In this manner, the advance of the row of cartons is controlled by the length of the cartons utilized, and is substantially independent of the travel of the pusher so that it is unnecessary to adjust the distance through which the pusher operates when using different size cartons. However, the position of the several cartons in the row, after being advanced by the pusher, will vary with the length of the cartons. The spacing between the filler nozzle 61 and the stapler mechanism is adjusted by moving the tank 59 along the tank support bar to a position such that when one of the quart containers is located below the filler nozzle, the sixth preceding container will be located below the stapler 114 as illustrated in Fig. 24. Only one carton is disposed between the carton being filled and the pusher 34 when the latter is in its extended position and in order to accommodate the different size cartons without adjusting the stroke of the pusher through a wide range, separate pusher plates 37 are provided for handling the different size cartons, the attaching lip 271 of the pusher plate 37 which is used for the two-quart size cartons being shorter than the corresponding attaching lip 264 used on the pusher plate for the one-quart size cartons.

The cartons may be manually fed to the machine in advance of the pusher 34, but conveniently the cartons are fed from the magazine 144 in timed relation with the operation of the pusher. As the pusher is extended, the finger 153 engages the lowermost carton in the magazine and moves the lower end thereof over the discharge opening 152. However, the slide underlies the discharge opening when the pusher is extended so that discharging of the carton does not occur until the pusher is retracted at which time the carton is fed, by gravity, in advance of the pusher.

As the pusher is extended to advance the cartons, the empty carton $c_1$ which is fed in advance of the pusher engages the tip of the opener plate 75. The carton guide 77 initially supports the carton which is fed to the pusher at an inclined position so that the upper corner of the gabled top of the carton strikes the tip of the opener plate. As the pusher engages the gabled top of the carton, the carton $c_1$ moves along the opener member 75 as shown in Fig. 7 to an intermediate position in which the top is partially opened. The carton $c_1$ then engages the immediately preceding carton $c_2$ and advances the row of cartons $c_2$—$c_9$ a distance equal to the length of one carton. The carton $c_3$ located below the filler nozzle 61 has the side panels $70a$ and $70b$ of the gabled top spread apart as shown in Fig. 9, and as the cartons are advanced through the closer assembly, the flaps $70c$ and $70d$ are interleaved as shown in Fig. 10 to reclose the gabled top. When the pusher is retracted, the carton, designated $c_6$ in Fig. 7, which is disposed below the depressor shoe 127 has the gabled top thereof depressed to form a compact rib for stapling. The carton, designated $c_9$, which is located at the stapler when the pusher is retracted, has a staple affixed thereto to seal the carton.

In certain types of cartons it is essential to accurately locate the position of the staple in the rib on the top of the containers and for this purpose the stop arm 138 is provided to accurately position the container at the stapler. The stop arm is moved into the path of the advancing cartons by the cam 143, also carried by the pusher actuating rod 36 to thereby stop the advance of the cartons when the leading face of one carton abuts thereagainst. Since the cartons tend to bulge when filled, the spacing between the cartons will vary somewhat dependent upon the strength of the cartons and the frictional resistance opposed to the advance thereof. The stop, when it engages the endmost carton at the stapling mechanism, prevents further movement of the endmost carton so that further extension of the pusher only effects compression of the cartons in the row between the pusher and the top arm.

When utilizing the filling machine to fill sizes smaller than one quart, that is, the pint and half-pint sizes, the vertical height of the container support track 38 is adjusted, as shown in Fig. 28 to maintain the tops of the cartons in proper relation to the pusher, the opener and closer assembly, and the staplers. Since the pint and half-pint sizes have the same cross sectional areas as the quart size, and differ only in length, the guide bars 48 and 49, which are provided for the quart size cartons, may also be used to guide these cartons. The pint and half-pint containers are relatively short and it is unnecessary to laterally guide the lower ends of these containers. Accordingly the channel guide 53 may be removed when handling these cartons, as shown in Fig. 28. It is necessary, however, to change the pusher plate 37 used in the handling of the smaller size cartons. As shown in Fig. 16, the pusher plate 37 is formed with an attaching lip 275 and a blade 276 which is spaced forwardly of the slide 35 a distance equal to the corresponding spacing of the blade 266 for the one-quart size pusher plate.

When filling the two-quart size cartons, which are relatively larger in cross section, the guide bars 48 and 49 are detached from the guide rails 32 and 33 respectively and secured to the posts below the guide rails to laterally guide the lower ends of the two-quart cartons as shown in Fig. 27. For this purpose, the width of the guide rails 32 and 33 is preferably made equal to the thickness of the bars 48 and 49 so that when the guide bars 48 and 49 are attached to the upstanding posts, the guide bars and guide rails will uniformly guide the two-quart cartons therebetween.

The filling machine is also adapted for manual operation in which event the previously described hydraulic control mechanism for operating the pusher cylinder 161 and the stapling cylinders, is not provided. The pusher 34 is arranged to be operated by a handle 291 shown diagrammatically in Fig. 18. As the pusher 34 is advanced by the handle, an operator 292 on the handle engages the filling switch 219 to thereby initiate operation of the timer 233. The latter, as previously described, energizes the valve solenoid 62 to thereby open the filler valve and dispense a measured quantity of liquid for a time interval measured by the timer 233. Stapling is effected hydraulically by means of a foot operated pump 294 which applies hydraulic pressure through conduit 295 to the stapling cylinders 101—104.

The filling machine is thus arranged so that the cartons are advanced in step fashion by a pusher mechanism. This eliminates the necessity of a complex and costly conveyer and further enables the filling machine to be easily adjusted to handle cartons of various sizes. Moreover, since the cartons are arranged in a row in sidewise abutting relation as they are advanced through the filler, the successive operations of opening, filling, closing and stapling may be achieved in a short space thereby providing a small and compact filling machine which may easily be moved to any desired position.

Each of the instrumentalities which contact the cartons as they are advanced by the pusher are designed to reduce or minimize the resistance imposed thereby to the advance of the cartons so that excessive pressure need not be applied by the pusher to the end carton to advance the row of cartons. Thus, the track 38 and the guide bars are arranged so as to reduce the frictional contact with the cartons, and the opener and closer is made short and shaped to have only a small contact area with the cartons so as to also reduce friction. The heat lamps 156 are provided to soften the wax on the carton tops to facilitate closing and sealing and also heat the closer assembly to prevent the buildup of wax thereon. The depressor is arranged for operation when the cartons are at rest and consequently does not impede the advance of the cartons but instead facilitates movement of the cartons into notch 108 in the block 107.

The pusher operated carton advancing mechanism is also arranged so as to provide a readily adjustable cycle for the filling machine. The pusher is hydraulically advanced and retracted at a controlled rate determined by the adjustment of the throttling valves 175 and 178. When the pusher advances to its extended position, the filler is operated for a time interval determined by the setting thereof to fill the carton therebelow. To accommodate different carton sizes requiring different fill times, it is only necessary to adjust the timer. The machine thus cycles to transfer the cartons to the next position as soon as the cartons are filled, thereby eliminating waste time between the time that the filling operation is stepped and the time at which the transfer of the cartons is effected. Since the extended position to which the pusher moves is determined by the setting of the switch actuating finger 225, the stroke of the pusher may be readily adjusted to control the position of the row of cartons.

I claim:

1. In an apparatus for filling preformed paper cartons having a gabled top, the combination of a filling mechanism, an elongated container support track, laterally spaced guide rails disposed above said support track for guiding a row of cartons from a loading station past the filling mechanism, a pusher reciprocably mounted adjacent one end of said rails and adapted upon movement in one direction to engage the end carton of the row of cartons and advance the row of cartons, an opening mechanism disposed above said rails extending from the filler mechanism towards the pusher to engage the gabled tops of the cartons and open the same as the cartons are advanced to the filler mechanism, a closing mechanism disposed above said rails and extending from said filler mechanism away from said pusher to engage the gabled tops of the cartons and close the latter as the cartons are advanced thereby, a stapler operated in timed relation with the advance of the cartons for stapling the gabled tops of the cartons as they are moved thereby, a depressor block mounted for vertical pivotal movement into and out of engagement with the gabled top of the containers, and means responsive to movement of said pusher in said other direction for pivoting said depressor block into engagement with the gabled tops of the cartons.

2. In an apparatus for filling preformed paper cartons having upwardly inclined panels and inner and outer closure flaps forming a gabled top, the combination of a filling mechanism having a dispensing nozzle, an elongated carton support track, laterally spaced guide rails disposed above said support track for guiding a row of cartons from a loading station past the filling mechanism, a pusher reciprocably mounted adjacent one end of said rails and adapted upon movement in one direction to engage the end carton of the row of cartons and advance the row of cartons, a wedge shaped member extending from the nozzle towards the pusher adapted for engagement with the gabled top of the cartons to open the latter as the cartons are advanced by the pusher to the nozzle, a closer assembly including a pair of vertically spaced wedge shaped plates extending from the nozzle in a direction away from the pusher, said plates having convergent guide edges at relatively opposite sides thereof for engagement with opposed upwardly inclined panels on the cartons, a presser finger overlying each of said guide edges to urge the respective inclined panels of the cartons into engagement therewith to thereby close the gabled tops of the cartons as they are advanced by the closer assembly, and means for sealing the gabled tops of the cartons.

3. In an apparatus for filling preformed paper cartons having upwardly inclined panels and inner and outer closure flaps forming a gabled top, the combination of a filling mechanism having a dispensing nozzle, an elongated carton support track, laterally spaced guide rails disposed above said support track for guiding a row of cartons from a loading station past the filling mechanism, a pusher reciprocably mounted adjacent one end of said rails and adapted upon movement in one direction to engage the end carton of the row of cartons and advance the row of cartons, a wedge shaped member extending from the nozzle towards the pusher adapted for engagement with the gabled top of the cartons to open the latter as the cartons are advanced by the pusher to the nozzle, a closer assembly including a pair of vertically spaced wedge shaped plates extending from the nozzle in a direction away from the pusher, said plates having convergent guide edges at relatively opposite sides thereof for engagement with opposed upwardly inclined panels on the cartons, a presser finger overlying each of said guide edges to urge the respective inclined panels of the cartons into engagement therewith to thereby close the gabled tops of the cartons as they are advanced by the closer assembly, means for sealing the gabled tops of the cartons, and a radiant heat device on said filling apparatus for heating the cartons as they are advanced through the closer assembly and for heating the closer assembly to prevent the buildup of wax from the cartons on the closer assembly and to promote sealing of the cartons.

4. In an apparatus for filling preformed paper cartons having upwardly inclined panels and inner and outer closure flaps forming a gabled top, the combination of a filling mechanism having a dispensing nozzle, an elongated carton support track, laterally spaced guide rails disposed above said support track for guiding a row of cartons from a loading station past the filling mechanism, a pusher reciprocably mounted adjacent one end of said rails and adapted upon movement in one direction to engage the end carton of the row of cartons and advance the row of cartons, a wedge shaped member extending from the nozzle towards the pusher adapted for engagement with the gabled top of the cartons to open the latter as the cartons are advanced by the pusher to the nozzle, a closer assembly including a pair of vertically spaced wedge shaped plates extending from the nozzle in a direction away from the pusher, said plates having convergent guide edges at relatively opposite sides thereof for engagement with opposed upwardly inclined panels on the cartons, a presser finger overlying each of said guide edges to urge the respective inclined panels of the cartons into engagement therewith to thereby close the gabled tops of the cartons as they are advanced by the closer assembly, means for sealing the gabled tops of the cartons, a depressor block mounted for vertical movement into and out of engagement with the gabled tops of the cartons as they move away from the closer assembly, and means operative in timed relation with the pusher means for moving said block into engagement with the cartons.

5. In an apparatus for filling preformed paper cartons having upwardly inclined panels and inner and outer closer flaps forming a gabled top on the carton, the combination of a filler having a dispensing nozzle, an elongated carton support track, laterally spaced guide rails for guiding a row of cartons past the filling mechanism, a wedge shaped member extending from the nozzle and adapted for engagement with the gabled tops of the cartons as they are moved therepast to open the cartons, a pusher mounted for reciprocation adjacent one end of said guide rails below the wedge shaped member adapted to engage the end carton in the row to advance the latter, said pusher being retractable away from the tip of the wedge shaped member a distance greater than the length of the cartons being filled to permit feeding a carton in advance of the pusher, said pusher being extendable below the wedge shaped member to move the gabled top of the carton engaged by the pusher onto the wedge shaped member to at least partially open the carton, and means mounted in the path of movement of the gabled tops of the cartons as the cartons move past the filler for closing the gabled tops of the cartons.

6. In an apparatus for filling preformed paper cartons having upwardly inclined panels and inner and outer closure flaps forming a gabled top on the carton, the combination of a filler having a dispensing nozzle, an elongated carton support track, laterally spaced guide rails for guiding a row of cartons past the filling mechanism, a wedge shaped member extending from the nozzle and adapted for engagement with the gabled tops of the cartons as they are moved therepast to open the cartons, a pusher mounted for reciprocation adjacent one end of said guide rails below the wedge shaped member adapted to engage the end carton in the row to advance the latter, said pusher being retractable away from the tip of the wedge shaped member a distance greater than the length of the cartons being filled to permit feeding a carton in advance of the pusher, said pusher being extendable below the wedge shaped member to move the gabled top of the carton engaged by the pusher onto the wedge shaped member to at least partially open the carton, means engageable with the carton fed in advance of the pusher for inclining the carton so that the gabled top thereof is inclined upwardly in the direction of advance of the carton by the pusher to facilitate entrance of the tip of the wedge shaped member into the gabled top of the carton, and means for closing the cartons after the filling thereof.

7. In a machine for filling preformed paper cartons having a gabled top, the combination of a support track, guide rails mounted above said track for guiding a row of cartons therealong, a stapler assembly at one end of the guide rails, a pusher mounted adjacent the other end of the guide rails for movement towards and away from the stapler assembly to advance the row of cartons in step fashion past the stapler, a filler mechanism having a dispensing spout, means mounting the filler mechanism for adjustment longitudinally of the guide rails to adapt the filling machine to handle different carton sizes, an opener and closer assembly for opening the cartons as they are advanced to the pusher and for closing the cartons after the cartons have been filled, means mounting the opener and closer assembly for adjustment longitudinally of the guide rails, and means for adjusting the stroke of the pusher to control the position of the carton at the opposite end of the row of cartons and below the stapler assembly.

8. In a machine for filling containers, the combination of a track for supporting a row of containers, a filler including a dispensing nozzle and a valve controlling the flow through said nozzle, a reciprocable pusher mounted for engagement with the end container in the row to advance the row in step fashion when the pusher is extended, an hydraulic apparatus for reciprocating the pusher including a piston connected to said pusher and a control valve operable to control the flow of pressurized fluid to opposite sides of the piston, a first electro-responsive means actuated in response to feeding an empty carton in advance of the pusher for operating said control valve to apply pressurized fluid to one side of said piston and extend said pusher, a second electro-responsive means including a switch actuated in response to extension of said pusher to a preselected position for operating said control valve to apply pressurized fluid to the other side of said piston and retract said pusher, and means for operating said filler valve in timed relation to the operation of said pusher.

9. In a machine for filling containers, the combination of a track for supporting a row of containers, a filler including a dispensing nozzle and a valve controlling the flow through said nozzle, a reciprocable pusher mounted for engagement with the end container in the row to advance the row in step fashion when the pusher is extended, an hydraulic apparatus for reciprocating the pusher including a piston connected to said pusher and a control valve operable to control the flow of pressurized fluid to opposite sides of the piston, a first electro-responsive means actuated in response to feeding an empty carton in advance of the pusher for operating said control valve to apply pressurized fluid to one side of said piston and extend said pusher, a second electro-responsive means including a switch actuated in response to extension of said pusher to a preselected position for operating said control valve to apply pressurized fluid to the other side of said piston and retract said pusher, and timer controlled means operable in response to actuation of said switch to open said filler valve for a selectively variable time interval.

10. In a machine for filling containers, the combination of a track for supporting a row of containers, a filler including a dispensing nozzle and a valve controlling the flow through said nozzle, a reciprocable pusher mounted for engagement with the end container in the row to advance the row in step fashion when the pusher is extended, an hydraulic apparatus for reciprocating the pusher including a piston connected to said pusher and a control valve operable to control the flow of pressurized fluid to opposite sides of the piston, a first electro-responsive means actuated in response to feeding an empty carton in advance of the pusher for operating said control valve to apply pressurized fluid to one side of said piston and extend said pusher, a second electro-responsive means for operating said control valve to apply pressurized fluid to the other side of the piston and retract the pusher, a third electro-responsive means for opening the filler valve, timer controlled means for energizing said second and third electro-responsive means for a selectively variable time interval, and means responsive to extension of said pusher to a preselected position for actuating said timer controlled means.

11. In a machine for filling containers, the combination of a track for supporting a row of containers, a filler including a dispensing nozzle and a valve controlling the flow through said nozzle, a reciprocable pusher mounted for engagement with the end container in the row to advance the row in step fashion when the pusher is extended, an hydraulic apparatus for reciprocating the pusher including a piston connected to said pusher and a control valve operable to control the flow of pressurized fluid to opposite sides of the piston, a first electro-responsive means actuated in response to feeding an empty carton in advance of the pusher for operating said control valve to apply pressurized fluid to one side of said piston and extend said pusher, a second electro-responsive means for operating said control valve to apply pressurized fluid to the other side of said piston and retract the pusher, a normally closed switch in said first electro-responsive means and a normally open switch in said second electro-responsive means, a timer actuatable to measure a predetermined time interval, means responsive to actuation of said timer for opening said filler valve for said measured time interval and for respectively opening and closing the normally closed and the normally open switches in said first and second electro-responsive means for said measured time interval to thereby prevent re-actuation of said first electro-responsive means during said measured time interval and to actuate said second electro-responsive means to retract the pusher, and means responsive to extension of said pusher to a preselected position for actuating said timer.

12. The combination of claim 11 wherein said last mentioned means includes a finger carried by said pusher for adjustment in a direction longitudinally of the track to thereby control the position to which the pusher is extended.

13. In a machine for filling containers, the combination of a track for supporting a row of containers, a filler including a dispensing nozzle and a valve controlling the flow through said nozzle, a reciprocable pusher mounted for engagement with the end container in the row to advance the row in step fashion when the pusher is extended, an hydraulic apparatus for reciprocating the pusher including a piston connected to said pusher and a control valve operable to control the flow of pressurized fluid to opposite sides of the piston, a first electro-responsive means actuated in response to feeding an empty carton in advance of the pusher for operating said control valve to apply pressurized fluid to one side of said piston and extend said pusher, a second electro-responsive means including a switch for operating said control valve to apply pressurized fluid to the other side of said piston, a finger on said pusher for operating said switch when the pusher reaches a preselected extended position, means for adjusting the finger relative to the pusher to adjust the position to which the pusher extends, and timer controlled means operable in response to actuation of said switch to open said filler valve for a selectively variable time interval.

14. In a container filling machine, the combination of a filling mechanism and a container sealing mechanism, guide rails for guiding a row of containers in endwise abutting engagement sequentially past the filling mechanism and the sealing mechanism, a single pusher reciprocably mounted on one end of said guide rails for rectilinear reciprocation in a path disposed between said guide rails, said pusher being adapted upon movement in one direction to engage the end container in the row of containers to advance the latter, a stop located adjacent said sealing mechanism and movable into and out of the path of the containers, and means actuated by said pusher means in response to movement of said pusher means in said one direction for moving said stop means into the path of the advancing containers to stop a container at the sealing mechanism in a predetermined position with respect thereto.

15. In a container filling machine, the combination of a filling mechanism and a container sealing mechanism, guide rails for guiding a row of containers in endwise abutting engagement sequentially past the filling mechanism and the sealing mechanism, a pusher reciprocably mounted on one end of said guide rails for rectilinear reciprocation in a path disposed between said guide rails and parallel thereto, said pusher being adapted upon movement in one direction to engage the end container in the row of containers to advance the latter, stop means mounted on said guide rails adjacent said sealing mechanism and having an arm movable into and out of the path of the containers, and cam means carried by said pusher and engageable with said stop means when said pusher is moved in said one direction to move said arm into the path of the advancing containers and stop a container in a predetermined position with respect to the sealing mechanism.

16. In a container filling apparatus, a filler for dispensing a quantity of material, a platform extending from a container loading station past the filler for supporting a row of containers thereon in endwise abutting relation, spaced guide means engageable with opposite sides of the containers for guiding the row of containers past the filler, means for advancing said row of containers in step fashion a distance equal to the length of one container measured in a direction along the row to position one of the containers in the row at a filling station below the filler, said container advancing means comprising a single pusher mounted for a rectilinear reciprocation adjacent one end of said platform for movement in a path disposed between said guide means and extending parallel thereto, an hydraulic apparatus for moving said pusher between an extended position and a retracted position, said hydraulic apparatus including a piston and a control valve operable to control the flow of pressurized fluid to opposite sides of said piston, means adapted to be actuated by a container fed between the pusher and the end container in the row for operating said control valve to apply fluid pressure to one side of said piston and extend the pusher, and means engageable with said pusher to be operated thereby when said pusher is moved to said extended position for operating said control valve to apply fluid pressure to the other side of said piston and retract the pusher.

17. In a container filling apparatus, a filler for dispensing a quantity of material, a platform extending from a container loading station past the filler for supporting a row of containers thereon is endwise abutting relation, spaced guide means engageable with opposite sides of the containers for guiding the row of containers past the filler, means for advancing said row of containers in step fashion a distance equal to the length of one container measured in a direction along the row to position one of the containers in the row at a filling station below the filler, said container advancing means comprising a single pusher mounted for a rectilinear reciprocation adjacent one end of said platform for movement in a path disposed between said guide means and extending parallel thereto, an hydraulic apparatus for moving said pusher between an extended position and a retracted position, said hydraulic apparatus including a piston and a control valve operable to control the flow of pressurized fluid to opposite sides of said piston, means adapted to be actuated by a container fed between the pusher and the end container in the row for operating said control valve to apply fluid pressure to one side of said piston and extend the pusher, means engageable with said pusher to be operated thereby when said pusher is moved to said extended position for operating said control valve to apply fluid pressure to the other side of said piston and retract the pusher, and means engageable with said pusher when the latter is moved to its extended position for operating said filler to dispense a quantity of material into the container therebelow.

18. In a container filling apparatus, a filler for dispensing a quantity of material, a platform extending from a loading station past the filler for supporting a row of containers thereon in endwise abutting relation, spaced guide means engageable with opposite sides of the containers for guiding the row of containers past the filler, means for advancing said row of containers in step fashion from the loading station to the filling station below the filler, said container advancing means comprising a single pusher mounted for a rectilinear reciprocation adjacent one end of said platform, an hydraulic apparatus for moving said pusher between an extended and a retracted position, said hydraulic apparatus including a piston and a control valve operable to control the flow of pressurized fluid to opposite sides of said piston, a first control means adapted to be actuated by a container fed between the pusher and the end container in the row for operating said control valve to apply fluid pressure to one side of said piston and extend the pusher, a second control means engageable with said pusher to be operated thereby when said pusher is moved to said extended position for operating said control valve to apply fluid pressure to the other side of said piston and retract said pusher, means responsive to movement of said pusher to said extended position for operating said filler to dispense a measured quantity of material into the container at the filling station, and means operatively connected to said filler for rendering said first control means inoperative while said filler is dispensing material to thereby prevent extension of said pusher means during the filling operation.

19. The combination of claim 18 including a magazine for storing containers to be filled, means actuated by said pusher means in response to reciprocation of said pusher from a retracted position to an extended position and back for feeding an empty container between the pusher and the end container in the row.

References Cited in the file of this patent
UNITED STATES PATENTS

| | | |
|---|---|---|
| 1,263,242 | Helson | Apr. 16, 1918 |
| 1,346,613 | Taliafero et al. | July 13, 1920 |
| 1,489,134 | Ladd | Apr. 1, 1924 |
| 1,636,208 | Bergmann | July 19, 1927 |
| 1,726,418 | Aldrich | Aug. 27, 1929 |
| 2,156,037 | Wollenweber | Apr. 25, 1939 |
| 2,583,106 | Kayat | Jan. 22, 1952 |
| 2,666,565 | Barnes et al. | Jan. 19, 1954 |

FOREIGN PATENTS

| | | |
|---|---|---|
| 643,809 | Germany | Apr. 17, 1937 |